United States Patent [19]

Staley

[11] 4,283,218
[45] Aug. 11, 1981

[54] MOLD MECHANISM

[75] Inventor: Warren D. Staley, Painted Post, N.Y.

[73] Assignee: Corning Glass Works, Corning, N.Y.

[21] Appl. No.: 120,329

[22] Filed: Feb. 11, 1980

[51] Int. Cl.³ .................... C03B 9/40; C03B 11/16
[52] U.S. Cl. .................................. 65/360; 65/357
[58] Field of Search .............................. 65/357, 360

[56] References Cited
U.S. PATENT DOCUMENTS

| | | | |
|---|---|---|---|
| 2,283,055 | 5/1942 | Gray et al. | 65/360 |
| 2,908,114 | 10/1959 | Fouse | 65/357 X |
| 3,622,305 | 11/1971 | Becker | 65/361 X |

Primary Examiner—Arthur D. Kellogg
Attorney, Agent, or Firm—Burton R. Turner

[57] ABSTRACT

A mold mechanism for opening and closing a split mold is described wherein a single air cylinder moves one half of the mold in a linear direction and simultaneously, through a plurality of interconnected pivotal links, rotates the other half of the mold through an arc of at least 90 degrees so as to open and close the mold halves upon actuation of the air cylinder.

9 Claims, 6 Drawing Figures

MOLD MECHANISM

BACKGROUND OF THE INVENTION

The present invention resides in the field of glass molds, and more particularly relates to an improved mold mechanism for opening and closing split molds utilized in blown glassware.

In the formation of hollow glassware, a charge of molten glass is usually initially formed into a parison such as by pressing or blowing such charge within a parison mold, and the thus formed parison is then transported to a blow mold for blowing the same into a finished article. Thus, it is necessary for the blow mold to open sufficiently to receive the preformed parison, close so as to form the desired mold cavity for blowing the parison into a finished article, and again open sufficiently wide so as to permit the removal of the finished article from the mold. Although some press and blow operations are accomplished with the blow mold in a stationary position, other operations include the utilization of a plurality of such blow molds positioned about a rotating table which successively receive a preformed parison carried by a conveyor, such as shown in U.S. Pat. Nos. 2,263,126 and 3,622,305.

The mold mechanism of U.S. Pat. No. 2,263,126 accomplishes both a straight line motion of the back half of a blow mold and a rotary motion of the front half of the blow mold from a single straight line driving motion imparted by an air cylinder. However, the mechanism of such patent utilizes a rack and pinion to provide the rotary motion to the front blow mold half, and due to constant wear and backlash between the rack and pinion, the mechanism becomes loose and erratic and accordingly affects glass quality produced thereby. Further, pieces of glass have a tendency to become lodged within the rack and pinion mechanism thus producing the jamming thereof and undesirable downtime.

It thus has been an object of the present invention to overcome such problems which existed with the prior art devices and provide a smooth operating mold mechanism for opening and closing the mold halves of a blow mold.

SUMMARY OF THE INVENTION

In its simplest form, the present invention relates to the mechanism for opening and closing split mold halves of a blow mold. An air cylinder having an operating rod is connected to one mold mounting member for moving the mold part mounted thereon in a linear direction while simultaneously pivoting a second mold mounting member having another mold part mounted thereon through an arcuate path by means of pivotal links actuated by the movement of said one mold mounting member to thereby open and close a two-part blow mold mounted on said mold mounting members.

DESCRIPTION OF THE PREFERRED EMBODIMENTS

Figure 2:
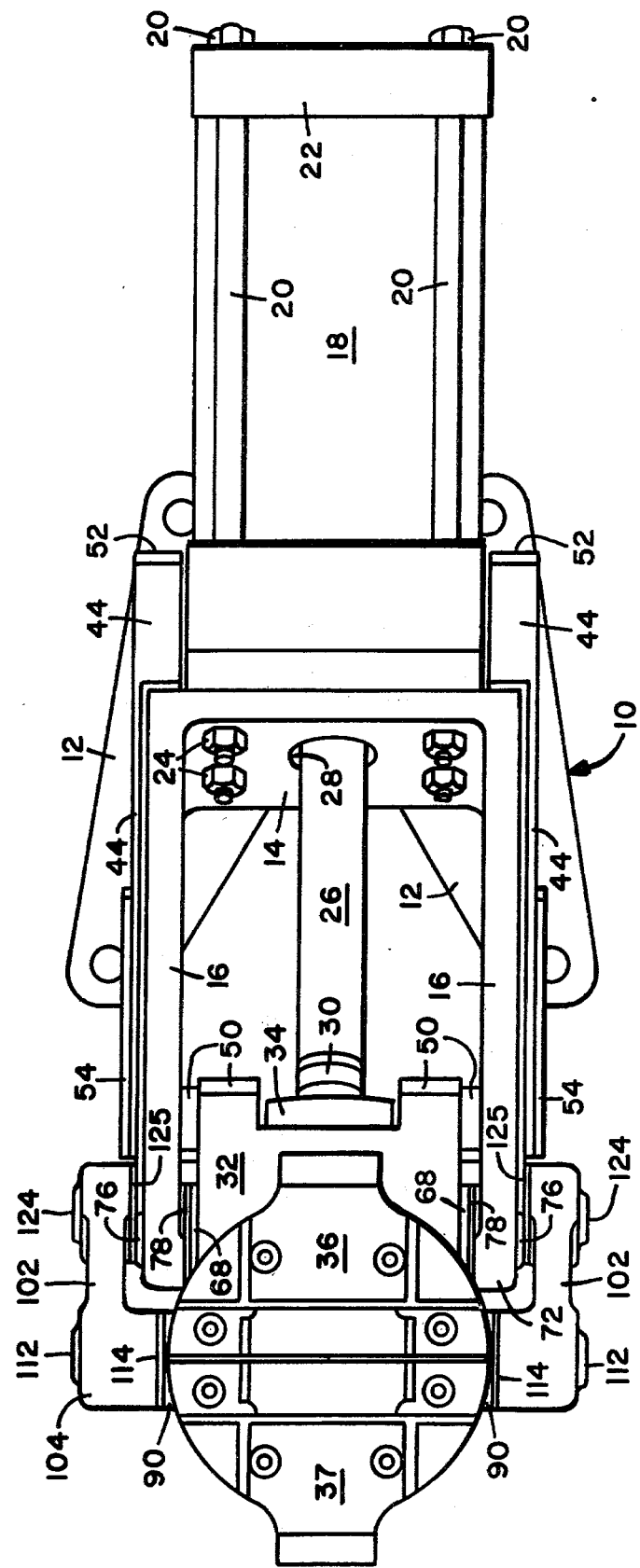
FIG. 2 is a top plan view of the apparatus shown in FIG. 1.

Referring now to the drawings, a mold mechanism support bracket or mounting frame 10 is shown having a base portion 12 which may be secured to a rotating table or other suitable support, a transverse back portion 14 and a pair of forwardly extending spaced apart arm portions 16. An air cylinder 18 is mounted upon the back portion 14 of the mounting frame 10 such as by means of a plurality of bolts 20 extending through a compression plate 22 at the rear of the cylinder and through back portion 14 so as to be held in place by tightening nuts 24. A cylinder operating rod 26 extends through an opening 28 (FIG. 2) in back portion 14, and at its outer end is provided with an adaptor 30 which is secured to a rear portion of a first or rear mold mounting member 32 by a retainer plate 34. A mold segment plate 36, having undercuts and keyway portions 38 for retaining a mold half 40, is mounted on the mold mounting member 32.

Figure 1:
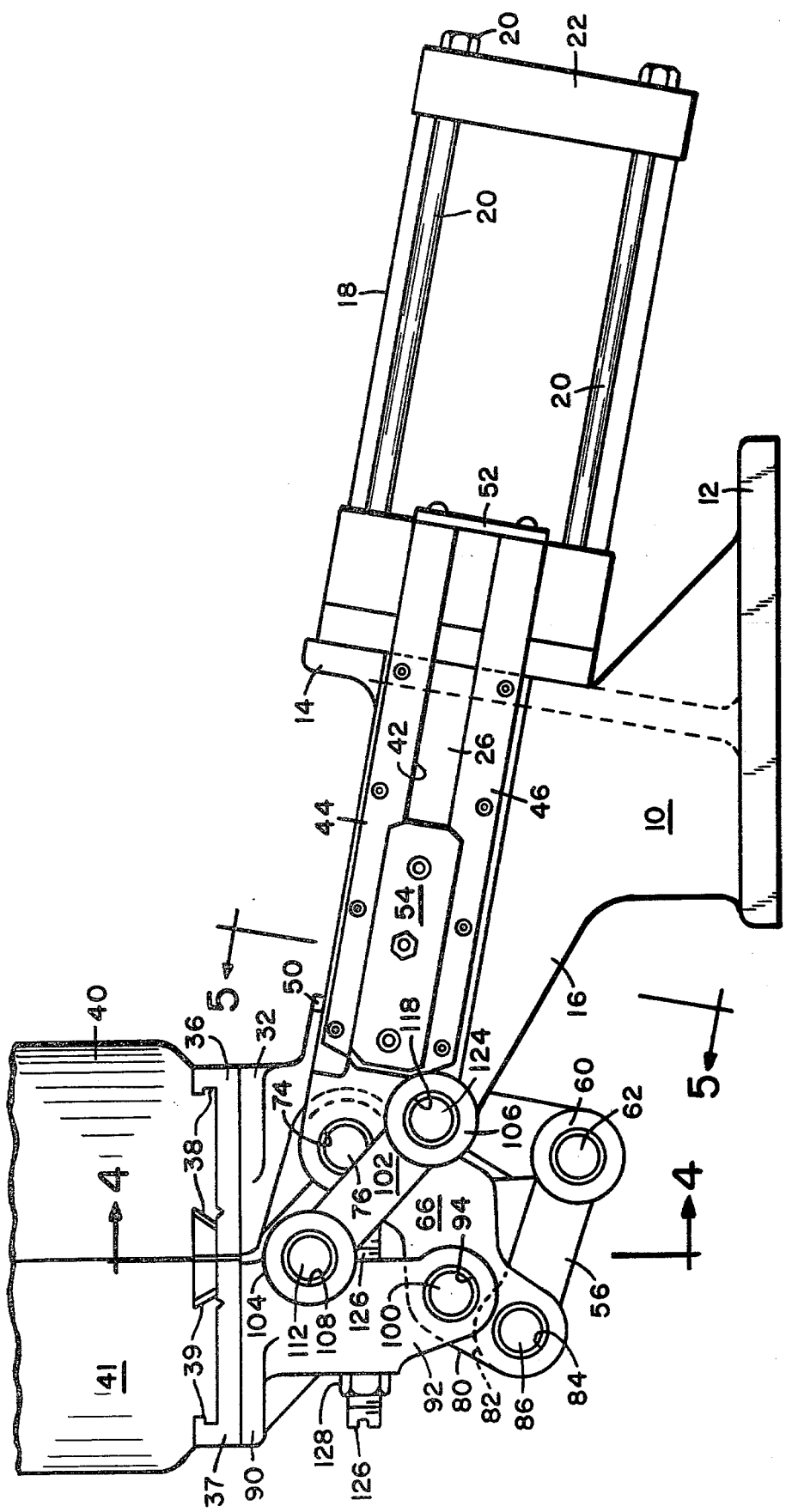
FIG. 1 is a side elevational view of a mold operating mechanism embodying the present invention, shown with the mold parts in a closed operating position.
Figure 5:
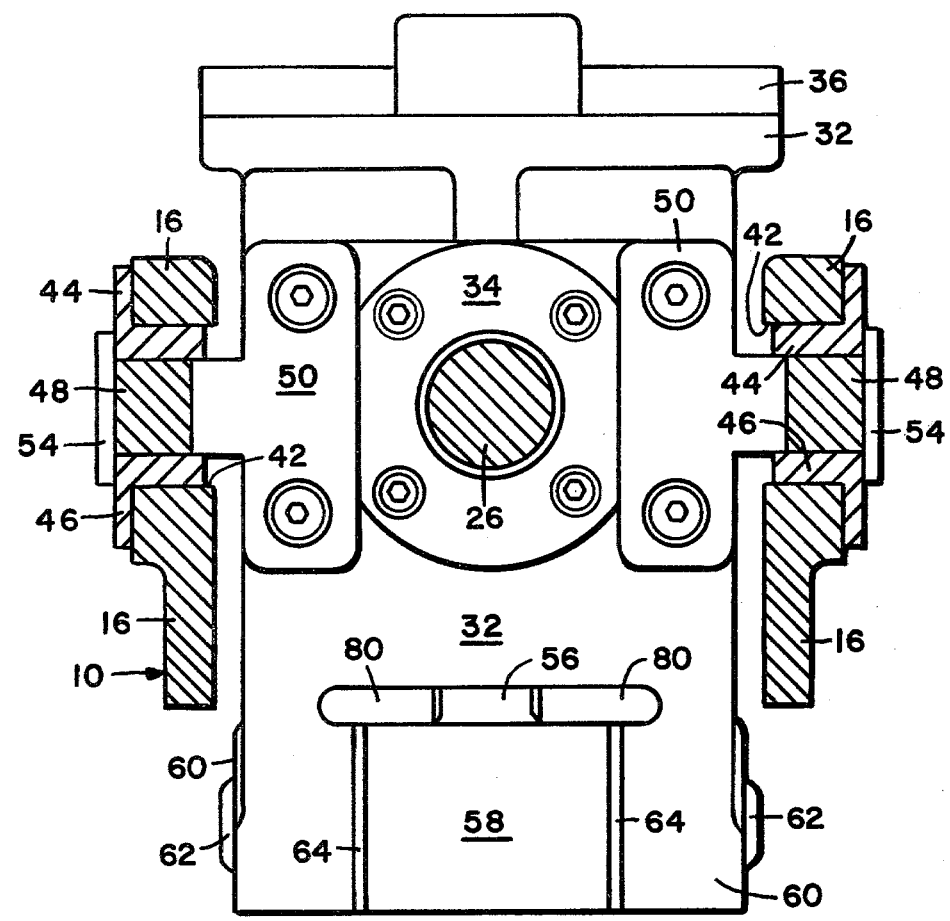
FIG. 5 is a sectional view in elevation taken along line 5—5 of FIG. 1.

Arm portions 16 of the mounting frame 10 each have a side slot 42 which is provided with an upper slide way member 44 and a lower slide way member 46, which function as wear plates (FIGS. 1 and 5). A pair of slide blocks 48, having connecting tabs 50, are secured to a rear surface of the first mold mounting member 32 so that the slide blocks 48 may freely slide within side slot 42 between the upper and lower slide way members 44,46, respectively. A pair of slide straps 52 are bolted to the rear ends of the upper and lower slide way members 44,46, respectively, to serve as stiffeners for the slide ways. Further, a slide block retainer plate 54 is bolted to the outer face of each slide block for sliding movement with the slide block along the outer edges of the upper and lower slide way members, and thus serve as guides for centering the sliding movement of the rear mold mounting member 32.

Figure 3:
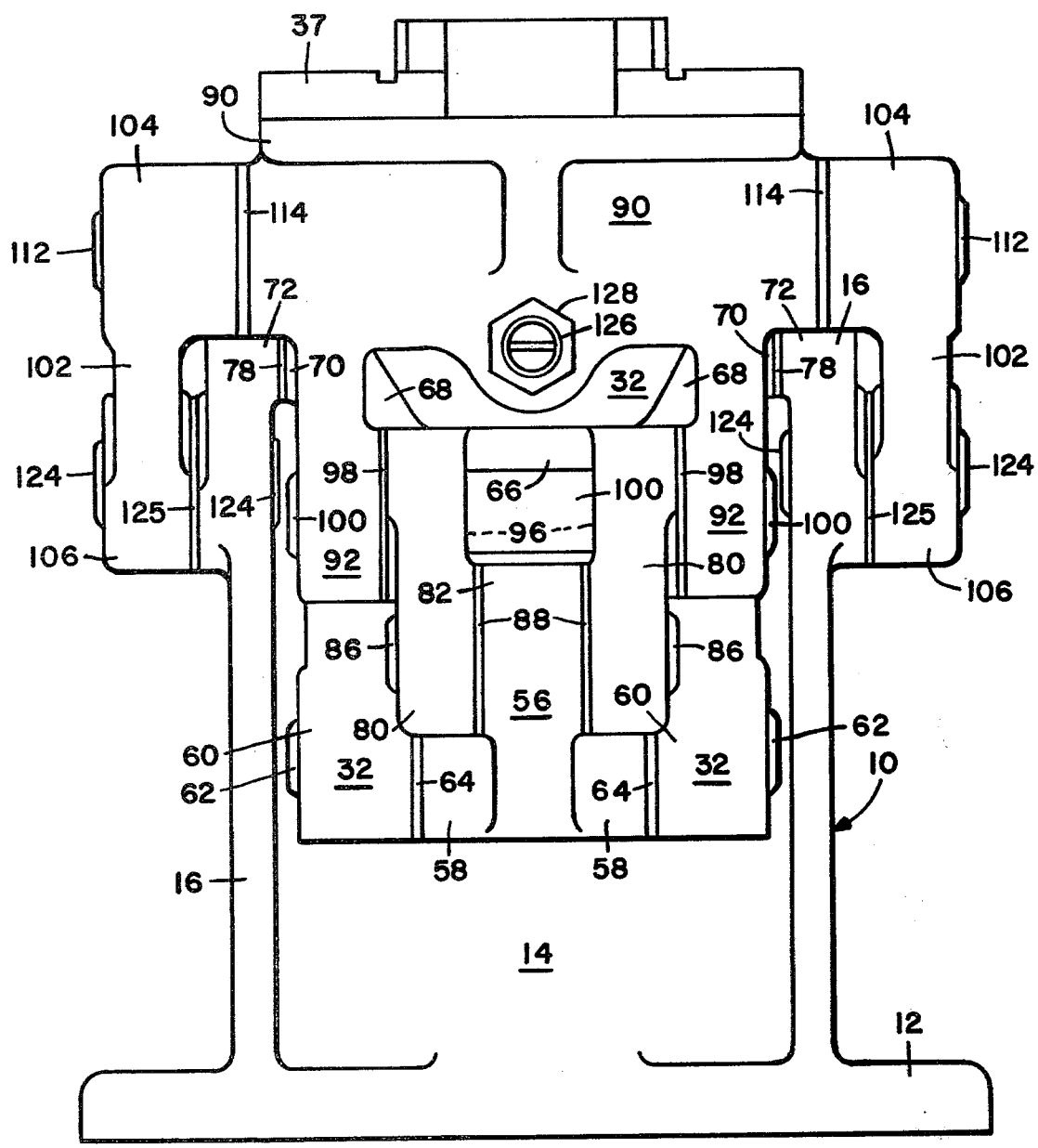
FIG. 3 is an end elevational view of the apparatus as viewed from the left end of FIG. 1.

A lower bottom link member 56 is pivotally mounted at one bossed end portion 58 to a bifurcated bossed lower end portion 60 of first mold mounting member 32 by means of a first pivot pin 62 and thrust washers 64 (FIG. 3). A central pivot link member 66 has an upper bifurcated portion 68 provided with a pair of bosses 70 having axially aligned bores extending therethrough. The arms 16 each have a bossed portion 72 at their upper end thereof provided with axially aligned bores 74 so as to pivotally mount the central pivot link member 66 to arms 16 by means of a pair of second pivot pins 76 and thrust washers 78. Each pin 76 extends through a bore 74 and one of said aligned bores passing through bosses 70 so as to pivotally mount central pivot link member 66 between the bossed portions 72 of arms 16.

The central pivot link member 66 has a lower bifurcated portion 80 which receives a bored forward end portion 82 of lower link member 56. The bifurcated end portion 80 has a pair of axially aligned bores 84 for pivotally connecting lower link member 56 by means of a third pivot pin 86 and thrust washers 88. It thus can be seen, that linear sliding movement imparted to the first mold mounting member 32 by air cylinder 18 through cylinder rod 26 causes central pivot link member 66 to pivot about the pair of second pivot pins 76, due to the action of lower link member 56 being pivotally connected at one end to the lower bifurcated end portion 60 of first mold mounting member 32 and the lower bifurcated portion 80 of central pivot link member 66.

A second mold mounting member 90 has a lower bifurcated portion 92 having a pair of axially aligned bores 94. The lower bifurcated portion 80 of central pivot link member 66 has a pair of axially aligned bores 96 (FIG. 3) located above bores 84. The second mold mounting member 90 is pivotally mounted to central pivot link member 66 by means of thrust washers 98 and a fourth pivot pin 100 extending through axially aligned bores 94 and 96 of second mold mounting member 90 and central pivot link member 66, respectively. Thus, the fourth pivot pin 100 will lie within an arc about the axis of pivot pins 76 as central pivot link member 66 is rotated about such axis.

Figure 4:
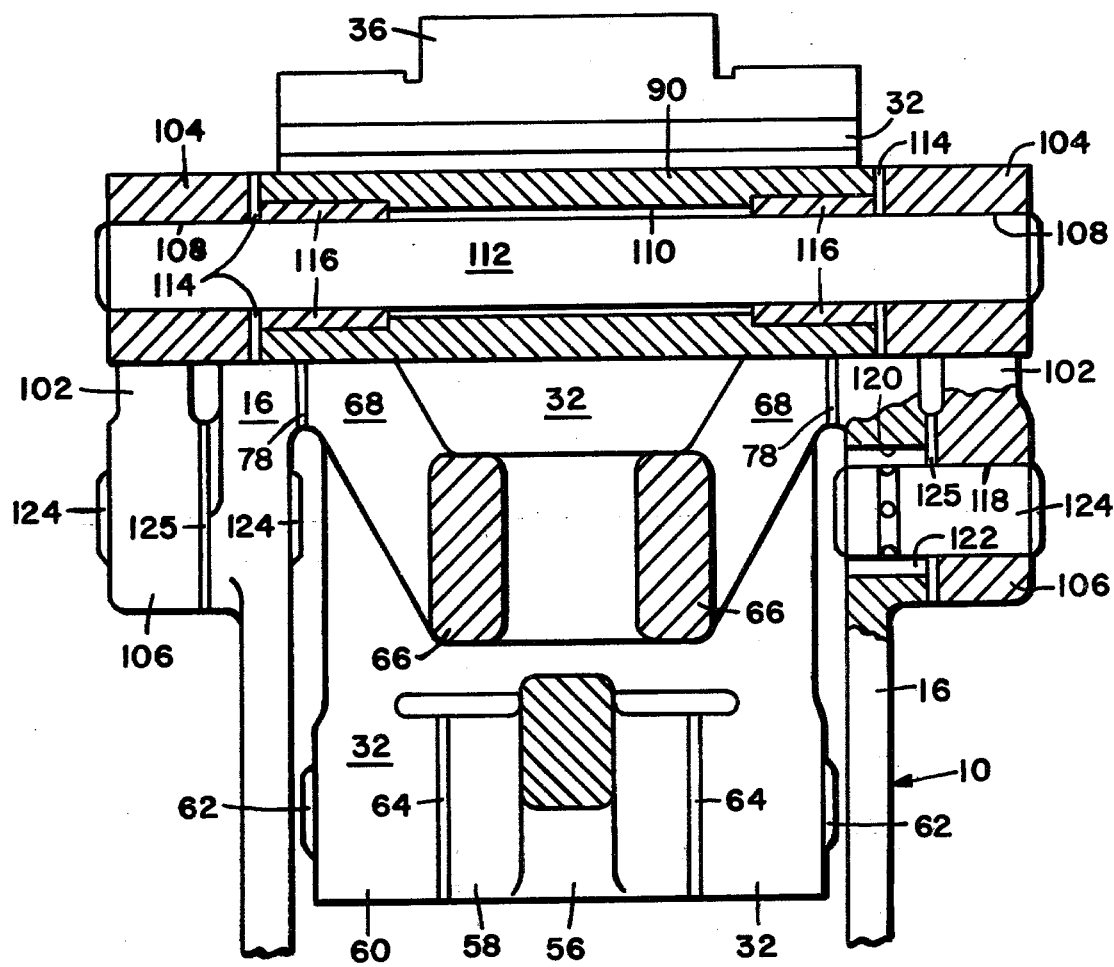
FIG. 4 is an elevational view in section taken along line 4—4 of FIG. 1, with a portion broken away to show a pivotal connection.

A pair of upper link members 102, each having an enlarged bossed end portion 104 and a smaller bossed end portion 106 pivotally connect the second mold mounting member 90 to the arms 16 of mounting frame 10 (FIGS. 3 and 4). The enlarged bossed end portion 104 of each upper link member 102 has a bore 108 extending therethrough. The second mold mounting member 90 has a bore 110 extending transversely therethrough which is in alignment with bores 108. Upper link members 102 and second mold mounting member 90 are pivotally connected together by a fifth pivot pin 112 extending through bores 108 and 110, together with thrust washers 114. Suitable bushings 116 may be utilized as desired in connection with fifth pivot pin 112, as well as the other pivot pins although not expressly shown in the drawings.

The smaller bossed end portion 106 of each of the upper link members 102 is provided with a bore 118, whereas arms 16 are each provided with a bore 120 which may be provided with a suitable bushing 122. A pair of sixth pivot pins 124 and thrust washers 125 pivotally connect upper link members 102 with arms 16 of the mounting frame 10 with pins 124 extending through bores 118 and 120 of the upper link members 102 and arms 16, respectively. Thus, pivot pin 112 lies on an arc about the axis of aligned pivot pins 124.

Of the six pivot pins utilized in the mold mechanism, it will be noted that only pivot pins 76 and 124 are in a fixed or stationary position, whereas the remaining pivot pins are all movably positioned. The first pivot pin 62 is linearly movable, whereas third pivot pin 86, fourth pivot pin 100 and fifth pivot pin 112 are arcuately movable. Further, the axis of fifth pivot pin 112 lies in a vertical plane bisecting the juncture of mold halves 40 and 41 when such mold halves are in a closed operational position. The second mold mounting member 90 is provided with a mold segment plate 37 having under cut and keyway portions 39 for retaining mold half 41.

An adjustment screw 126, having a tightening nut 128, is adjustably threaded through an opening 130 in second mold mounting member 90, and has an abutment nose portion 132 for engaging a stop member 134 secured to first mold mounting member 32 so as to limit the closing of the mold parts 40,41 for proper alignment of such mold segments. Further, it will be appreciated that suitable lubrication fittings may be secured to all journals as is well known in the art.

Figure 6:
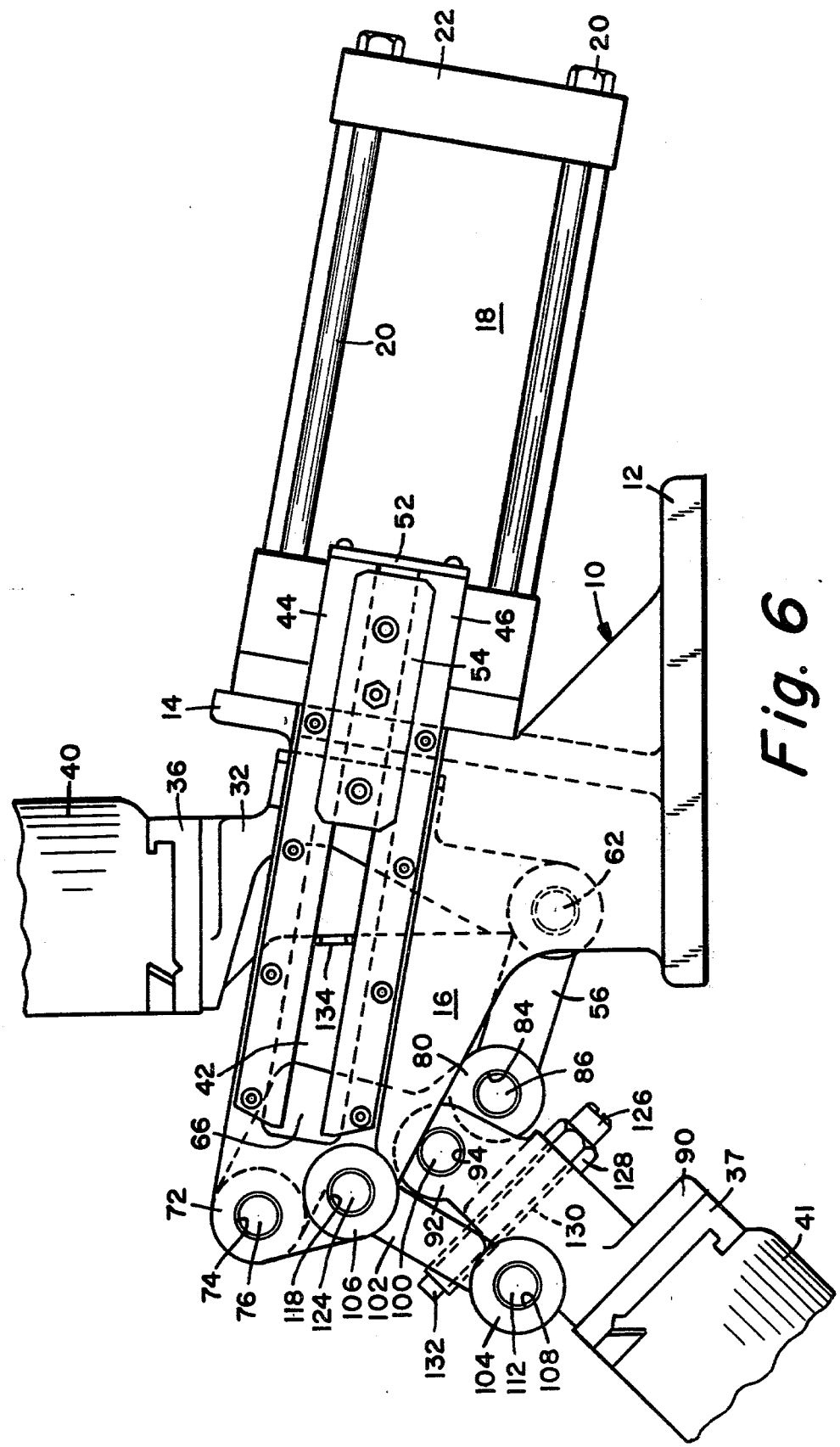
FIG. 6 is a side elevational view of the mold operating mechanism shown in FIG. 1 but with the mold mounting members shown with the mold parts in the full mold open position.

In operation, with the mold mechanism in its closed operative position as shown in FIG. 1, such that the mold halves 40 and 41 are in a closed upright position forming a complete operative mold, air cylinder 18 is energized at its forward end to retract its piston and accordingly cylinder operating rod 26 connected thereto, so as to move first mold mounting member 32 linearly rearwardly from the position shown in FIG. 1 to the position shown in FIG. 6. As the cylinder operating rod 26 is retracted by cylinder 18, mold half 40 is moved linearly rearwardly as first mold mounting member 32 is slid rearwardly by means of slide blocks 48, connected to mounting member 32 by means of connecting tabs 50, sliding between upper and lower slide way members 44,46, respectively positioned within slide slots 42. As first mold mounting member 32 moves rearwardly, lower link member 56, pivotally connected at one end to first mold mounting member 32 by means of first pivot pin 62 and pivotally connected at its opposite end to lower bifurcated portion 80 of central pivot link member 66 by means of a third pivot pin 86, pivotally rotates central pivot link member 66 about second pivot pins 76 connecting said central pivot link member 66 to arms 16 of the mounting frame 10.

However, as central pivot link member 66 rotates about second pivot pins 76, the second mold mounting member 90 pivots about fourth pivot pin 100, connecting such second mold mounting member to the central pivot link member, as the fourth pivot pin 100 rotates through an arc about the axis of second pivot pins 76. Finally, upper link members 102, pivotally connected at one end to the second mold mounting member 90 by fifth pivot pin 112 and at their opposite ends to arms 16 of mounting frame 10 by means of sixth pivot pins 124, guide the pivotal opening movement of second mold mounting member 90 by pivoting such mold mounting member about fifth pivot pin 112 as such pin moves through an arc about the axis of sixth pivot pins 124, so as to move such second mold mounting member and accordingly mold half 41 into their full open position as shown in FIG. 6.

It will be appreciated that by energizing the rearward end of cylinder 18, its piston and operating rod 26 will be moved forwardly thus linearly moving first mold mounting member 32 and mold half 40 forwardly to its closed position while simultaneously pivotally moving second mold mounting member 90 and mold half 41 back to its closed position shown in FIG. 1 by reversing the above described pivotal movements which were performed to pivotally open such mold half. Adjustment screw 126 in conjunction with stop member 134 facilitates the correct alignment and positionment of the mold segments when moved into their closed position.

Although I have disclosed the now preferred embodiment of the invention it will be apparent to those skilled in the art that various changes and modifications may be made thereto without departing the spirit and scope thereof as defined in the appended claims.

I claim:

1. Apparatus for opening and closing mold segments of a two-part mold which comprises, support means, first mold mounting means for retaining a first mold segment mounted for sliding movement on said support means, second mold mounting means for retaining a second mold segment pivotally mounted with respect to said support means, means for reciprocally moving said first mold mounting means linearly along said support means for opening and closing said mold mounting means, pivotal link means connecting said first mold mounting means to said second mold mounting means and said second mold mounting means to said support means for pivotally opening and closing said second mold mounting means simultaneously with and in response to the sliding linear opening and closing of said first mold mounting means for opening and closing the mold segments carried by said mold mounting means; and said pivotal link means including central pivot link means for pivotally connecting said second mold mounting means to said support means, and lower link means connecting said first mold mounting means to said central pivot link means for rotating said central pivot link means about a pivot on said support means and simultaneously pivoting said second mold mounting means into an open or closed position in response to the linear movement of said first mold mounting means along said support means by said moving means.

2. Apparatus for opening and closing mold segments as defined in claim 1 wherein said central pivot link means includes a central pivot link member pivotally connected at one end to said support means, said lower link means includes a lower link member pivotally connecting one end of said central pivot link member to said first mold mounting means, and said second mold mounting means being pivotally connected to said central pivot link member intermediate its ends.

3. Apparatus for opening and closing mold segments as defined in claim 2 wherein said pivotal link means includes a pair of upper links each pivotally connected at one end to said support means and at an opposite end to said second mold mounting means.

4. Apparatus for opening and closing mold segments as defined in claim 1 wherein said pivotal link means also includes a pair of upper link members pivotally connecting said second mold mounting means to said support means, said central pivot link means being pivotally connected at one end to said support means about a first pivot axis and intermediate such ends to said second mold mounting means about a second pivot axis, said upper link members being pivotally connected at one end to said support means about a third pivot axis and at an opposite end to said second mold mounting means about a fourth pivot axis, and said second mold mounting means being mounted for pivotal movement about said second and fourth pivot axes as said second pivot axis moves in an arc about said first pivot axis and said fourth pivot axis moves in an arc about said third pivot axis.

5. Apparatus for opening and closing mold segments as defined in claim 4 wherein said means for reciprocally moving said first mold mounting means includes an air cylinder and a cylinder operating rod operatively connected to said first mold mounting means, and slide block means secured to said first mold mounting means for sliding movement within slide way means formed on said support means.

6. Apparatus for opening and closing mold segments as defined in claim 4 including adjustable means mounted on one of said mold mounting means for abutment with the other of said mold mounting means for adjusting the alignment and closing of the mold segments carried by said mold mounting means and thereby provide an operative closed mold when said mold mounting means are in a closed position.

7. Apparatus for opening and closing the mold halves of a two-part mold which comprises, a mounting frame, a first mold mounting member slidably mounted on said mounting frame for linear movement therealong between an opened and closed position, a first mold half carried by said first mounting member, a second mold mounting member carrying a second mold half mounted for pivotal movement with respect to said mold mounting member, means for pivotally mounting said second mold mounting member to said mounting frame, said pivotally mounting means including a central pivot link pivotally mounted to said mounting frame about a first axis, lower link means pivotally mounted at one end to said central pivot link about a second axis and at its opposite end pivotally connected to said first mold mounting member about a third axis for pivoting said central pivot link about said first axis in response to linear movement of said first mold mounting member, said second mold mounting member being pivotally connected to said central pivot link about a fourth axis intermediate said first and second axes, upper link means pivotally connected at one end to said second mold mounting member about a fifth axis and at an opposite end pivotally connected to said mounting frame about a sixth axis, and means for slidably moving said first mold mounting member linearly along said mounting frame and through said pivotally mounting means simultaneously pivoting said central pivot link through said lower link to pivot said second mold mounting member about said fourth and fifth axes as said fourth and fifth axes move in arcs about said first and sixth axes, respectively, for opening and closing the first and second mold halves carried by said mold mounting members.

8. Apparatus for opening and closing mold halves as defined in claim 7 wherein said means for slidably moving said first mold mounting member linearly along said mounting frame includes an air cylinder having an operating rod operatively connected to said first mold mounting member.

9. Apparatus for opening and closing mold halves as defined in claim 7 including adjustment means carried by said second mold mounting member for limiting the closing of the mold halves for proper alignment of the mold segments into an operable mold.

* * * * *